Dec. 25, 1934.  B. BEARDSLEY  1,985,850
DRAG CONVEYER
Filed Aug. 12, 1931
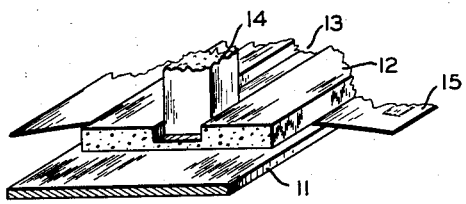
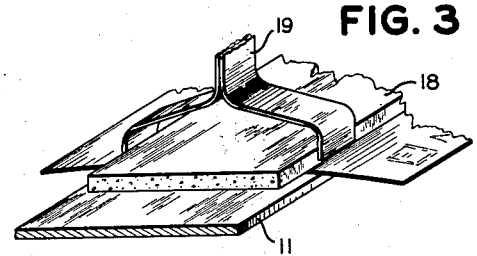
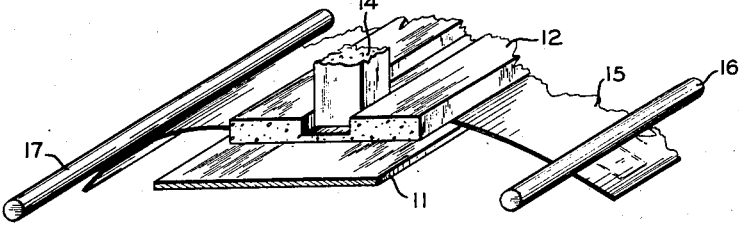
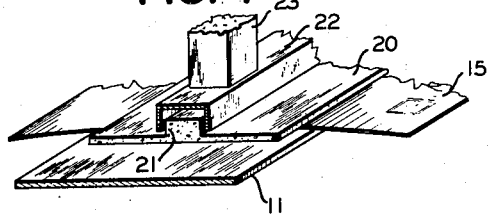
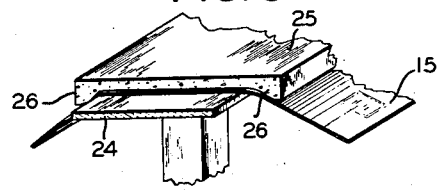
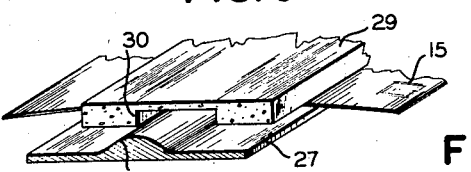
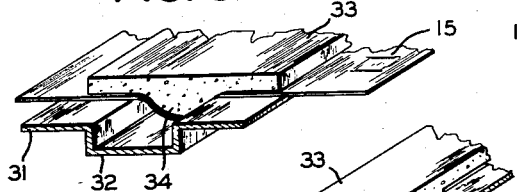
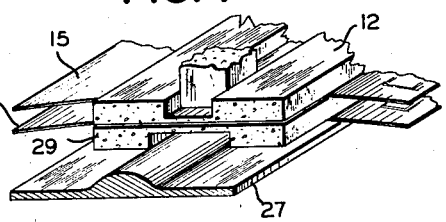
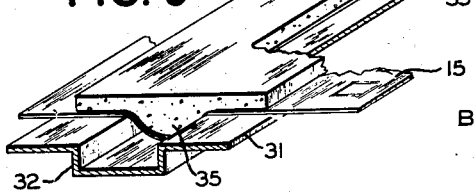
INVENTOR
B. BEARDSLEY
BY ATTORNEY
Eugene C. Brown Patented Dec. 25, 1934

1,985,850

UNITED STATES PATENT OFFICE 1,985,850

DRAG CONVEYER

Bruce Beardsley, Brooklyn, N. Y., assignor to The Western Union Telegraph Company, New York, N. Y., a corporation of New York Application August 12, 1931, Serial No. 556,640

10 Claims. (Cl. 198—160)

This invention relates to drag conveyers, more particularly to conveyers embodying a supporting member and a belt travelling upon the supporting member for conveying sheet material between the belt and support by frictional engagement with the belt; and has for an object to provide a simplified form of support and means for retaining the belt in proper transporting relation to the support.

Conveyers for transporting sheet material such as telegram blanks, messages and the like have gone into extensive commercial use, particularly in connection with conveyer systems employed in district or relay offices of commercial communication concerns where messages which are received in one part of the building may have to be transferred to another part of the building to be sent out over the proper communication channel. The conveyer systems are employed in collecting the messages and routing the same to the proper part of the building for dispatching over the communication channel. Drag type conveyers have been used quite extensively in such conveyer systems.

As heretofore constructed drag type conveyers for conveying sheet material have employed a channel member of relatively less width than the width of the sheets of material to be conveyed and a conveyer belt arranged to travel in said channel. The belt is ordinarily of less width than the channel so that the channel member has lateral portions of substantial width which extend beyond the edge of the conveyer belt. According to my present invention, I propose to employ a conveyer support or channel for the conveyer belt which has a width substantially equal to the width of the belt. With this arrangement the supporting member can be made lighter and will be less expensive than the type of support channel member which extends out beyond the edges of the belt. I have found that this type of support will function effectively as a conveyer channel if means are provided for properly guiding the belt on the supporting member. The conveyer belt and supporting member according to this invention is of considerably less width than the width of the sheets to be conveyed so that, as the sheets of material travel along the support between it and the travelling belt, the overhanging edges of the sheets tend to bend upwardly and deform the portion of the sheets engaged between the belt and the channel and thereby maintain continuous engagement with the belt. I have found that this deformation is quite sufficient to maintain the material in proper contact with the belt. Also by using the narrower type of conveyer channel or support I have been able to produce a simpler and less expensive form of conveyer.

In one form of my invention I provide guide means for the conveyer belt by forming the back surface of the belt to embody an undulation which may be in the form of a groove or a ridge. A guide member in the form of a bar or channel member is arranged to engage the undulated portion of the belt. The engaging portion may be continuous along the belt or may engage the belt at spaced points therealong.

Another form of the invention employs a belt having an undulation in the surface thereof in engagement with the support and has a ridge or a groove formed in the support for engaging the undulated portion of the belt to properly retain the same on the support as it travels therealong.

Another object of my invention therefore is to provide a drag conveyer employing a conveyer channel or support of substantially the same width as the belt.

Still another object is to provide a drag conveyer having a belt travelling upon a support with means for guiding the belt and maintaining the same in proper transporting relation with the support.

A still further object of my invention is to provide a conveyer belt embodying undulations on the surface and means in engagement with the undulations for guiding the belt as it travels.

These and other objects of my invention will appear from the following description and claims taken in connection with the accompanying drawing forming a part of this application, in which:

Fig. 1 is a fragmentary view of one form of my invention showing a groove in the back of the conveyer belt with the guiding member engaging the groove;

Fig. 2 is a view of the same form as Fig. 1 with means added to definitely bend downwardly the overhanging edges of the messages;

Fig. 3 is a view of another form in which the guiding member spans the conveyer belt and engages the outer edges thereof;

Fig. 4 is a view of another form in which a ridge is formed on the back of the conveyer belt for guiding the same;

Fig. 5 is a view of still another form in which the conveyer support is of less width than the belt with the overhanging edges of the belt arranged to guide the same on the support;

Fig. 6 is a view of a form in which the belt has a groove formed in the face thereof which engages the channel and a bead formed on the channel over which the groove travels;

Fig. 7 is a view of the form shown in Fig. 6 with the addition of a belt as shown in Fig. 1 making a double conveyer arrangement;

Fig. 8 is a view of a form having a bead formed on the surface of the belt in engagement with the support and a groove formed in the support in which the bead travels; and Fig. 9 is a view of a modified form of Fig. 8 in which sections of the bead are cut away so that the same will act as clear outs.

Referring now to the drawing, the form of the invention shown in Fig. 1 embodies a longitudinally extending supporting member 11 and a conveyer belt 12 arranged to travel on the supporting member. An undulation 13 in the form of a groove is embodied in the upper or back surface of the belt. A stationary slide or guide member 14, suitably spaced from the support to permit the belt to be raised by the material being conveyed, fits into the groove 13 so that as the belt travels along the support it will be maintained in a substantially central relation to the latter. The slide or guide member 14 may comprise a continuous strip or a sufficient number of members substantially as shown spaced longitudinally along the conveyer.

The conveyer is arranged to admit sheet material such as telegram blanks, messages and the like, between the support and the traveling belt. A fragmentary section of a message 15 is shown as being transported along the conveyer. As can be readily seen, the message blank is considerably wider than the conveyer support or channel member 11 and the belt 12. The message blanks are inserted into the conveyer so that they are engaged by the conveyer substantially along their central portion. In this manner the edges of the message blanks overhang the conveyer support and the weight of the overhanging portions of the blanks tend to bend the outer edges down and bend upwardly or deform the portion of the message lying across the conveyer support. The deformation in the massage blank will cause the central portion thereof to tend to rise and maintain itself in engagement with the belt 12 as it travels along the support, even though the belt may not remain firmly in contact with all parts of the channel as it travels over any uneven portions which may occur in the channel.

It should be noted that the channel member in this embodiment, and those illustrated in Figs. 2 to 5 as well, are plain flat strips, an extremely simple form, and that the special belt shapes are readily procurable.

In addition to the foregoing, it has been found that when the sides or the lateral portions of a relatively narrow type of conveyer support or channel are flat, or in other words, extend in opposite directions in the same plane, the effectiveness of the tendency of the message to spring up in its midportions, due to the weight of the overhanging edge portions of the message, is greater than when the sides are bent upwardly or downwardly and extend an appreciable amount beyond the edge of the belt.

In the embodiment shown in Fig. 2, the conveyer support 11, the belt 12 and the guide member 14, are substantially of the same form as shown in Fig. 1. Bars 16 and 17 have been added to this embodiment and arranged to engage the overhanging portion of the messages and definitely bend the same downwardly at the edge of the conveyer support. This arrangement is especially advantageous when a section of the conveyer is arranged to carry messages upwardly or downwardly in a vertical direction. In this manner the conveyer will function substantially the same as when messages are transported in a horizontal direction.

The embodiment shown in Fig. 3 employs the same type of conveyer support 11 as the foregoing embodiments. However, a plane belt 18 is employed and lateral guide means for the belt is provided by a yoke member 19 which spans the entire width of the belt and engages the outer edges thereof. The yoke member 19 may be a continuous channel member or several of such members may be employed at suitable spaced points along the conveyer belt to hold the same in proper relation to the support 12. The member 19 when in the form of a continuous channel may be made in any desired shape which will loosely engage the outer edges of the belt and at the same time provide clearance for the back of the belt to allow the same to ride over an increased thickness of material being conveyed, such as when a bunch of messages or an envelope is fed into the conveyer.

Fig. 4 illustrates another embodiment employing a flat supporting member 11. With this embodiment, however, the belt 20 instead of being provided with a groove in its back surface in which a guide member slides, is provided with a ridge or tongue 21. A guide member 22 in the form of a channel embodying a groove is arranged to engage the tongue at the back of the belt to maintain the same on the support. The guide member 22 may be supported at points along its length by suitable structural members 23. A suitable clearance is provided between the tongue 21 and the guide member 22 to allow free movement of the belt as it travels along the support and also to permit the belt to ride over several thicknesses of material being conveyed. In other respects the embodiment of Fig. 4 functions substantially the same as the embodiment in Fig. 1.

Fig. 5 illustrates the invention embodied in still another form. In this embodiment the conveyer support member 24 is of relatively less width than the conveyer belt 25. In other words, the conveyer belt when positioned centrally over the support will ride with its edges overhanging the sides of the support. The edges of the conveyer belt are provided with thickened portions or beads 26 on its under surface. These bead portions serve a double function, one of which is to definitely bend the overhanging portions of the message blank 15 downward to cause the midportion to more effectively engage the belt. Secondly, the beads 26 serve to form guide members for the belt and maintain the same on the support as it travels.

Still another embodiment of the invention is illustrated in Fig. 6. In this form the guide member instead of being a separate element engaging the back surface of the belt as in some of the foregoing embodiments, is provided directly on the conveyer support. A support member 27 has a bead or tongue portion 28 extending longitudinally of the center thereof. The conveyer belt 29 has a recess or groove 30 extending longitudinally of the underneath surface and arranged to fit over the bead 28 of the support member. In this embodiment, the message blanks 15 will be fed into the conveyer so that they are engaged between the belt and the support and lie across the bead 28 which will cause them to be pressed more or less into the groove 30. In this manner, the groove 30 traveling over the bead 28 serves not only to guide the conveyer belt in the support, but in addition serves to cause the messages to be more effectively engaged by the belt due to a portion of the message being pressed into the groove on the engaging surface of the belt. When the tendency of the message to spring up from the conveyer support due to the overhanging edges thereof has the above mentioned effect added thereto, the result is that the message blanks are exceedingly well gripped by the conveyer belt and a very effective form of conveyer results.

Fig. 7 illustrates the possibility of combining the forms illustrated in Fig. 1 and Fig. 6. The conveyer belt arrangement of Fig. 1 is merely superposed on the conveyer of Fig. 6 which results in a double conveyer having two conveying channels, in other words, two separate means for transporting the sheets of material. The first channel, as clearly appears in the drawing, comprises the support member 27 and the conveyer belt 29, the material being carried along the support by frictional engagement with the lower surface of the belt. The second channel comprises the conveyer belt 29 and conveyer belt 12 which are arranged to travel one upon the other in the same direction and preferably at the same speed. With this arrangement, the message blanks 15 may be fed into the conveyer in any well known manner and may be admitted from separate or independent sources and discharged, likewise, in two separate or independent receivers.

The arrangement illustrated in Fig. 8 may be considered the inverse of the arrangement illustrated in Fig. 6. This arrangement embodies a conveyer channel 31 provided along the central portion with the longitudinally extending groove 32 instead of a bead as in Fig. 6. A conveyer belt 33 rides on the support with its side portions overlying the sides of the support. The central portion of the belt embodies a bead or tongue 34 arranged to fit in the groove of the support. The tongue provides means for guiding the belt as it travels along the support and also means to deform message blanks such as blank 15 which are being conveyed along the support. The tendency for the message blank to straighten out will act to maintain the deformed portion more effectively in engagement with the belt.

Fig. 9 illustrates a modified form of the embodiment or arrangement illustrated in Fig. 8. In this embodiment the bead or tongue 35, instead of being formed as the continuous projection on the bottom surface of the belt is cut away so as to leave only short lengths of the bead at intervals in the underside of the belt. When the bead sections or projections are properly spaced along the belt, they will serve not only to guide the belt as it travels along the channel but also as clear out elements which will clear out the channel or carry along any messages that may have a tendency to stick to the channel. Messages which are fed into conveyer so as to be engaged by one of the clear out projections as they enter the conveyer will be deformed substantially in the same manner as they would be in the arrangement shown in Fig. 8. Messages which enter the conveyer in the space lying between the clear out strips will ordinarily remain straight at their central portion and rest on the outer edges of the channel member and be carried therealong by the engagement of the outer portions of a traveling belt. Should these messages tend to stick to the channel they will be carried along by the clear out projection when it reaches the sticking message substantially as already described.

From the foregoing description, it will be observed that I have provided drag conveyer arrangements embodying channel members of the simplest form and have provided means for guiding the belt and maintaining the same on the channel members. In addition, I have provided a drag conveyer arrangement of relatively less width than the width of the material to be conveyed and have arranged such conveyers to embody channel members and conveyer belts of substantially the same width, which results in a form of conveyer which will take advantage of the tendency of sheet material being conveyed with the sides thereof overhanging the conveyer channel to maintain the central portion of the message in effective engagement with the conveyer belt.

It is to be understood that although I have described my invention as being embodied in drag conveyers that it may be embodied in other types of conveyers.

While I have shown my invention in but nine forms, it will be obvious to those skilled in the art that it is not so limited but is susceptible to various other changes and modifications without departing from the spirit thereof, and I desire, therefore, that only such limitations shall be placed thereon as are imposed by the prior art or as are specifically set forth in the appended claims.

What I claim is:

1. A drag conveyer embodying longitudinally extending supporting means, a conveyer belt adapted to travel on said supporting means, one surface of said belt embodying a transverse undulated portion extending longitudinally of the belt, and continuous guide means engaging the undulated portion of the surface to maintain the belt in conveying position with respect to the supporting means as it travels thereon.

2. In a drag conveyer, a longitudinally extending support, a conveyer belt adapted to travel along said support for conveying sheet material between it and the support by frictional engagement with the belt, the support and belt being of substantially the same widths and of materially less width than that of such sheet material whereby substantially all of the said sheet material not in engagement with said belt extends over the sides of said support, and guide means cooperating with the support for maintaining the belt in conveying relation to the support, said guide means and said belt embodying interfitting tongue and groove portions.

3. In a drag conveyer for conveying sheet material, a longitudinally extending support, a conveyer belt adapted to travel along said support for conveying the material by frictional engagement therewith, and guide means independent of the support for maintaining the belt in conveying relation to the support, said guide means and the back surface of said belt being provided with interfitting tongue and groove portions.

4. In a drag conveyer for conveying sheet material, a longitudinally extending support of relatively less width than the width of the sheet material to be conveyed whereby the edges of the sheet material overhang the sides of the support as it is conveyed thereon, a conveyer belt adapted to travel along said support for conveying the material by frictional engagement therewith, and means independent of the support arranged to engage the belt along the portion thereof in contact with the support for maintaining the belt in conveying relation therewith, and means also independent of the support for engaging the overhanging edge portions of the sheet material to maintain the same in non-planiform shape as it travels along the support.

5. In a conveyer for conveying sheet material, a conveyer belt of less width than the width of the sheet material, a longitudinally extending support for the belt of substantially the same width as the belt, said belt embodying an undulated portion in the support engaging surface thereof, said support embodying marginal portions which the sheet material overhangs, said marginal portions being disposed in the same plane and extending in opposite directions, said support being arranged to cooperate with the undulated portion of the belt to form a guide for the belt as it travels on the support.

6. In a drag conveyer for conveying sheet material, a longitudinally extending support, a conveyer belt adapted to travel along said support for conveying sheet material between the belt and the support by frictional engagement with the belt, and cooperating guide means embodied in the support and the belt serving to maintain the belt in conveying relation to the support, and also to maintain sheet material in non-planiform shape as it travels along the support, said guide means comprising interfitting tongue and groove portions, one of said portions being embodied in the support and the other in the belt.

7. In a drag conveyer for conveying sheet material, a longitudinally extending support, a conveyer belt adapted to travel along said support for conveying sheet material between the belt and the support by frictional engagement with the belt, and cooperating guide means embodied in the support and the belt serving to maintain the belt in conveying relation to the support, and also to maintain sheet material in non-planiform shape as it travels along the support, said guide means comprising a discontinuous tongue portion interfitting with a grooved portion, one of said portions being embodied in the support and the other in the belt.

8. In a drag conveyer, a longitudinally extending support, a conveyer belt adapted to travel along said support for conveying sheet material by frictional engagement therewith, said support being of relatively less width than the sheets of material to be conveyed and embodying marginal portions lying in the same plane and extending in opposite directions, and separate guide means for maintaining the belt in conveying relation with the support, said guide means comprising members disposed to engage the opposite edges of the active portion of the belt and arranged to permit the sheet material to extend beyond the edges of the belt between the guide means and the support as the material travels along the support.

9. A drag conveyer for sheet material, such as telegram blanks, comprising a stationary longitudinally extending support, a belt adapted to travel along said support in contact therewith for conveying sheet material between the belt and support by frictional engagement thereof with the belt, said belt being of a width materially less than that of the sheet material and said support being of a width substantially equal to the width of the belt whereby substantially all of said sheet material not actually in frictional contact with the belt extends outwardly beyond the sides of said support and means extending longitudinally of said belt and said support for restricting lateral movement of the belt relative to the support.

10. In a conveyer for conveying sheet material, a conveyer belt of substantially less width than the width of the sheet material, a longitudinally extending support for the belt of substantially the same width as the belt, said belt embodying a portion offset from the plane of the support engaging surface of the belt, said support embodying marginal portions over which substantially all of the sheet material not in actual engagement with the belt extends, said marginal portions being disposed in the same plane and extending in opposite directions and such support being arranged to cooperate with the offset portion of the belt to form a guide for the belt as it travels on the support.

BRUCE BEARDSLEY.